United States Patent
Grinberg et al.

(10) Patent No.: US 9,239,718 B2
(45) Date of Patent: Jan. 19, 2016

(54) SYSTEM FOR FIELD UPGRADING OF FIRMWARE IN MULTIPLE UNITS

(71) Applicant: Honeywell International Inc., Morristown, NJ (US)

(72) Inventors: Paul Grinberg, Minneapolis, MN (US); Gary Kasper, Champlin, MN (US); Jeffrey Randall, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/718,680

(22) Filed: Dec. 18, 2012

(65) Prior Publication Data

US 2014/0173581 A1 Jun. 19, 2014

(51) Int. Cl.
*G06F 9/44* (2006.01)
*G06F 9/445* (2006.01)

(52) U.S. Cl.
CPC ..................... *G06F 8/665* (2013.01)

(58) Field of Classification Search
None
See application file for complete search history.

(56) References Cited

U.S. PATENT DOCUMENTS

| | | | |
|---|---|---|---|
| 7,761,863 B2 | 7/2010 | Illowsky et al. | |
| 7,904,608 B2 | 3/2011 | Price | |
| 8,005,879 B2 | 8/2011 | Bornhoevd et al. | |
| 8,594,850 B1* | 11/2013 | Gourlay et al. | 700/276 |
| 2008/0052384 A1 | 2/2008 | Marl et al. | |
| 2013/0205288 A1* | 8/2013 | Sohm | 717/168 |
| 2014/0033193 A1* | 1/2014 | Palaniappan | 717/173 |

FOREIGN PATENT DOCUMENTS

EP WO2012028541 * 8/2012

OTHER PUBLICATIONS

"HP PCM Plus v4 Network Management Software Series," 5 pages, Updated Nov. 2011.
ACTi Connecting Vision, "ACTi IP Utility User's Manual," Version 4.01.06, 18 pages, Jan. 1, 2012.

* cited by examiner

*Primary Examiner* — Anil Khatri
*Assistant Examiner* — Timothy Duncan
(74) *Attorney, Agent, or Firm* — Seager, Tufte & Wickhem LLP

(57) ABSTRACT

A system for upgrading firmware in multiple units or devices of a building control or automation system. A computer may have a tool that can reflash the firmware with an upgrade. The tool may reflash the firmware of multiple devices automatically without intervention of an operator. Devices having firmware that need an upgrade may be identified and classified as eligible for a firmware upgrade. Devices having firmware similar to firmware in other devices may be grouped with the latter devices for upgrading together, sequentially or in parallel, to simplify and expedite firmware upgrading of the devices. Firmware of devices in the field may be upgraded via a communication network or the like by the computer with the tool. The firmware upgrade, communications and/or associated activity associated with the upgrade may be proprietary and/or secured from public availability.

17 Claims, 6 Drawing Sheets

SYSTEM FOR FIELD UPGRADING OF FIRMWARE IN MULTIPLE UNITS

BACKGROUND

The present disclosure pertains to devices in a system and particularly to firmware of such devices. More particularly, the disclosure pertains to upgrading firmware.

SUMMARY

The disclosure reveals a system for upgrading firmware in multiple units or devices of a building control or automation system. A computer may have a tool that can reflash the firmware with an upgrade. The tool may reflash the firmware of multiple devices automatically without intervention of an operator. Devices having firmware that needs an upgrade may be identified and classified as eligible for a firmware upgrade. Devices having firmware similar to a firmware in other devices may be grouped with the latter devices for upgrading together, sequentially or in parallel, to simplify and expedite firmware upgrading of the devices. Firmware of devices in the field may be upgraded via a communication network or the like by the computer with the tool. The firmware upgrade, communications and/or associated activity associated with the upgrade may be proprietary and/or secured from public availability.

DESCRIPTION

Figure 1:
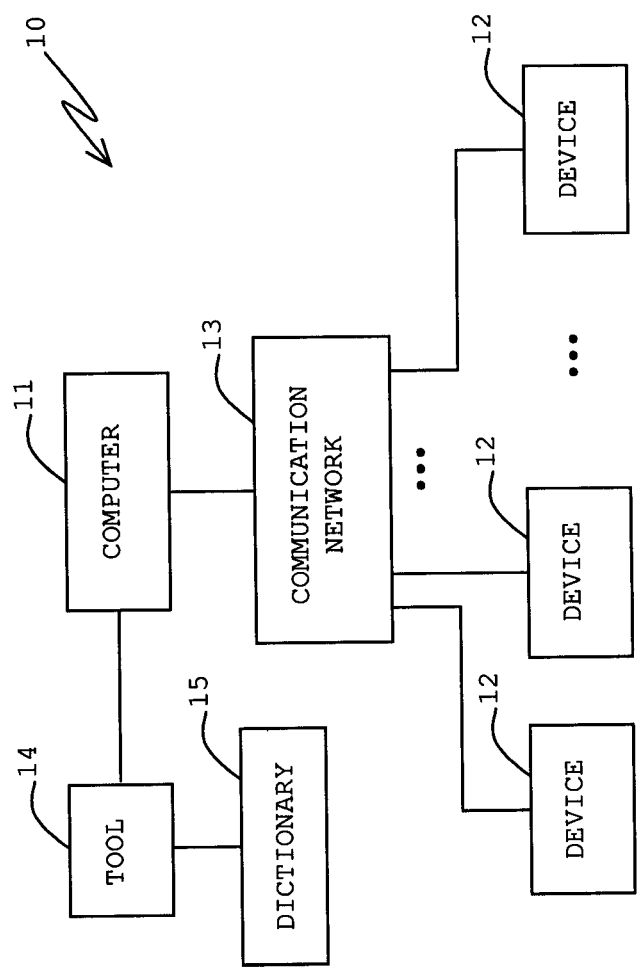
FIG. 1 is a diagram of a basic component layout for upgrading firmware in multiple units.

The present system and approach, as described herein and/or shown in the Figures, may incorporate one or more processors, computers, controllers, user interfaces, wireless and/or wire connections, and/or the like, in an implementation.

This description may provide one or more illustrative and specific examples of implementing the present system and approach. There may be numerous other examples of implementing the system and approach not necessarily disclosed in detail within the present description.

The information in the Figures is for illustrative purposes only.

Products with embedded firmware, in which the firmware can be upgraded by the customer, may be described as field upgradeable. Field upgrading the firmware may be used to resolve some latent defect or to introduce/remove some capability into/from a device. In devices where the only means of upgrading the firmware is over the communication network linking the device to a computer such as a PC, the speed of firmware upgrading may be dictated in large part by the speed and quality of this communication network.

In cases of heating, ventilation and air conditioning (HVAC) communication, each of these target devices may take 10 minutes or longer per device to upgrade the firmware. Since typical HVAC systems have dozens, if not hundreds of such devices, the time to upgrade the entire system is very long. Moreover, customers do not necessarily want to take an action once every ten minutes to advance from the first device to the next. They simply may want to queue up multiple units for a firmware upgrade, click the start button once and go away.

There may be multiple prerequisites for this system: 1) The PC tool should be able to discover virtually all devices on the network; 2) The target devices should be able to identify themselves over the communication network to the PC tool; and 3) The PC tool should reference some dictionary to identify the discovered devices as being capable of a firmware upgrade or not. This could be a simple or as complex a set of rules as needed to fully describe the technical and business driven limitations of field firmware upgradeability.

The PC tool may show virtually all discovered devices. Those devices may fall into multiple groups (i.e., Group 1 is reflashable to version A, group 2 may be reflashable to version B, group 3 is not necessarily reflashable at all, and so forth). The first aspect of this system is that the tool may automate the selection of virtually all devices in the same group to make the upgrading of "like" devices very simple.

After virtually all devices in a single group desired for upgrade are selected, the user should then select what version to upgrade them to (there may be many choices, some applicable, some not). Another aspect of this system may be the ability of this tool to pre-filter the list of available versions down to only the applicable versions. This could be possible because the devices may have identified themselves to the tool and the tool may have a dictionary of what should be possible. This pre-filtering of choices may greatly reduce the user interaction, making it easier and less error prone.

Once the upgrading of a group of devices is initiated, it may be the case that something is causing a problem. Another aspect of this system may be that devices should be reflashed one at a time. This way, the PC tool may look at the status of previous 1, 2, N reflash operations to see if one or more of them have failed. If that's the case, the tool may abort subsequent reflash operations, thus preventing additional problems.

The sequential nature of upgrading a block of devices may also mean that substantial time may pass between the discovery of virtually all devices and starting the block upgrade and the time when one of the later units is attempted to reflash. During that time, a customer may unknowingly swap that device with an incompatible device. Another aspect of the system is that the PC tool may virtually always check the device for compatibility before starting its reflash, even if that device was discovered at an earlier time. This may prevent undesired reflash operations.

The dynamic nature of a block operation (i.e., skipping devices, early termination of job, and so forth) may cause confusion to a customer who wants to know when the block operation will be complete. Another aspect of this system may be the adaptable nature of the progress bar, which may adjust its time to completion based on known information.

The approach and system described in this system may consist of multiple parts, virtually all related to a PC tool. This tool should have graphical elements which are driven from data either computed by or handled by the tool first.

FIG. 1 is a diagram of a basic component layout 10 for upgrading firmware in multiple units. A computer 11 may be connected to a number of devices 12 via a communication network 13. Computer 11 may also be referred to as a "PC". Computer 11 may have a tool 14 and a dictionary 15 associated with tool 14. Tool 14 and dictionary 15 may be situated in computer 11. Devices 12 may have firmware which can be upgraded by tool 14.

Tool 14 may be a reflash tool that can allow a user to upgrade or downgrade firmware on multiple devices 12. With a quick start, firmware may be downloaded to devices with the following steps: 1) Connect to interface device (LON or BACnet); 2) Scan for devices; 3) Select a device or devices to receive firmware; 4) Press a "download firmware to device" button; 5) Select firmware to download to the devices or devices; 6) Press "start download" button to begin download; and 7) Wait for the download process to complete. An example of a device may be a Honeywell Spyder™ device. The present tool may provide the buttons and directions for the operation.

Figure 2:
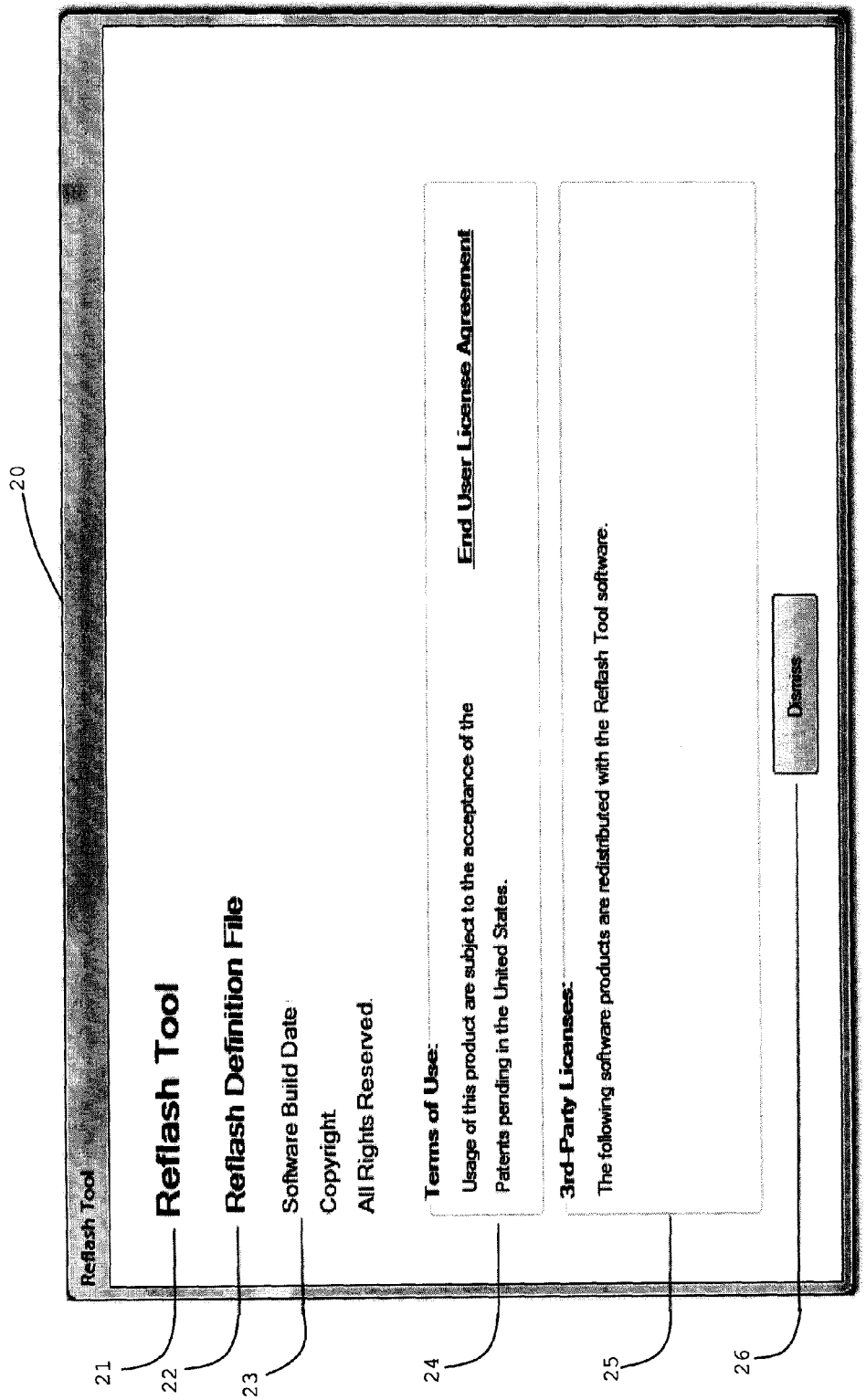
FIG. 2 is a diagram of a splash screen that may be displayed when a reflash tool is started.

A splash screen 20 in FIG. 2 may be displayed when the tool is started. Splash screen 20 may close after five seconds or so, or by clicking on screen 20 with a mouse or pressing a "dismiss" button 26. Screen 20 may also be displayed by clicking on "About reflash Tool" under a "Help" menu and remain visible for a longer period of time, such as sixty seconds.

Item 21 of screen 20 may indicate the reflash tool version number. Item 22 may indicate the reflash definition file version number. The reflash definition file may contain a database of device brands and specification to help identify a particular device when searching a network.

An outdated definition file might be the cause if "unknown" device types are encountered while searching a network. One may check with a device contract supplier to insure that one is using the latest definition file. If a new file is required, one may download the file from the internet. One may copy the file to the reflash tool directory located in the My Documents directory. One may overwrite the old version with the new version.

Item 23 may indicate a reflash tool build date. This field may display the build date of the reflash tool. This may be the date that the software was created for the current version. Item 24 may indicate the terms of use. This section may allow a screen to be opened to read an "End User License Agreement". One may click on the highlighted link and it will open a text screen.

Item 25 may be for indicating a 3rd-party license. This section may allow a screen to be opened to read a "3rd-Party License Agreement". One may click on the highlighted links to open a text screen. Item 26 may indicate a dismiss button. Pressing this button may close the screen.

Figure 3:
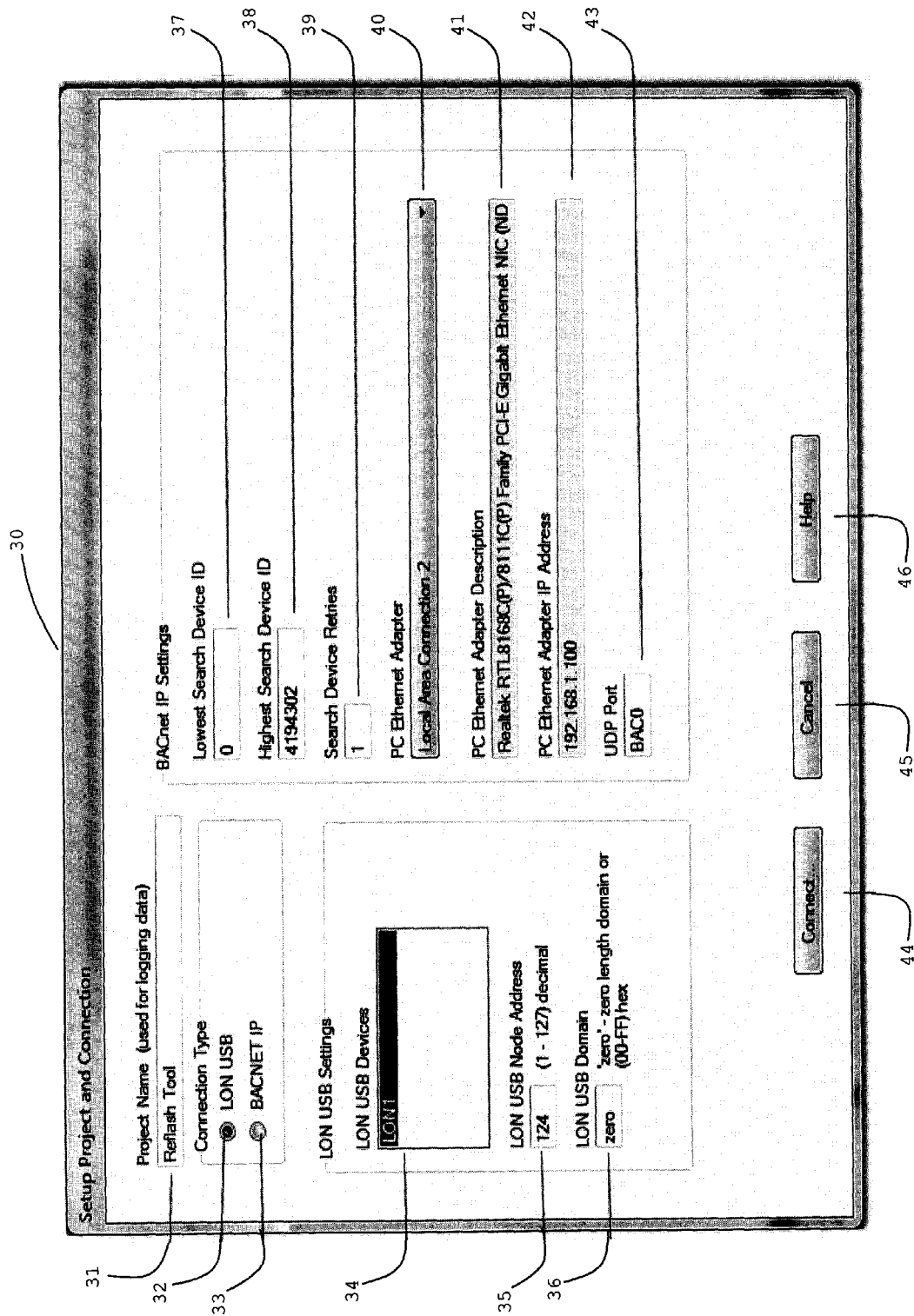
FIG. 3 is a diagram of a connect screen that may allow a selection for one of several types of interfaces.

FIG. 3 is a diagram of a connect screen 30. The connect screen may allow a selection for one of the following types of interfaces. A LON connection may require a LON U10/U20 USB network interface device or other LON interface. A BACnet connection type may require a BACnet/IP to MS/TP adapter (or equivalent). Other interfaces may be developed.

In diagram 30 of FIG. 3, item 31 may indicate a project name. One may enter a project name in this field. The project name may be used as the name of the log files that are generated when discovering devices and/or downloading firmware to those devices. The log files may be stored in the user's document directory. Item 32 may indicate a LON USB option. One may select this option for connections to an Echelon LonWorks Network. A LON network interface device should be installed.

Item 33 may indicate a BACNET/IP option. One may select this option for connections to a BACnet network. A BACnet/IP to MS/TP adapter (or equivalent) device should be installed and be addressable by the computer's network interface card. Item 34 may indicate a LON USB device list. One may select one of the USB adapters in the listbox for a connection. If the listbox is empty, it could mean that one has not installed the open LDV drivers or that one has never connected the USB interface device to the PC (Computer 11).

Item 35 may indicate a LON USB node address. One may use this field to change the LON USB node address from the default value of 124. The range for this value may be 1 to 127. Item 36 may indicate a LON USB domain. One may use this field to change the LON USB domain. This value may be used to search for LON devices using their domain tables 0 and 1 as a match. The range for this value may be 00 to FF in hexadecimal or "zero" for the zero length domain. "Zero" may be the default setting. If devices are not being found during the search operation, this lack of finding may be caused by not having the correct domain ID number in the field.

If "BACNET IP" was selected in item 33 instead of "LON USB" then, Item 37 may indicate a BACnet lowest search ID. The field may be used to change the lowest device search ID from the default value of 0. This value may be used as the starting point when searching for BACnet devices on a network. Any BACnet device ID below this value will not necessarily be detected during a search operation. Item 38 may indicate a BACnet highest search ID. The field may be used to change the highest device search ID from a default value of 4194302. This value may be used as an ending point when searching for BACnet devices on a network. Any BACnet device ID above this value will not necessarily be detected during a search operation.

Item 39 may indicate BACnet search retries. The field may be used to change the number of search retries required when searching for BACnet devices. By default, the search mechanism may retry searching for devices once during its operation.

Item 40 may indicate a PC Ethernet adapter. This combobox (pull-down listbox) may contain virtually all of the configured Ethernet adapters found on the PC. The Ethernet Adapter should be enabled and have a valid IP address for it to be included in the list. Some PC's may have more than one Ethernet adapter. One may select the adapter that is connected to the BACnet/IP router. If the only entry is "None", then no connection can necessarily be made for the BACnet communications mode. One may check with the Windows control panel for network devices to see if the Ethernet adapter is enabled and on-line.

Item 41 may indicate a PC Ethernet adapter description. The read only text may display additional information about the Ethernet adapter that was selected. Item 42 may indicate a PC Ethernet adapter IP address. This read only text may display the IP address for the selected Ethernet adapter.

Item 43 may indicate a BACnet IP router access port. The field may be used to change the BACnet/IP router access port. The default port number may be BAC0. The value may be a four digit hexadecimal value.

Item 44 may indicate a connect button. One may press the button to connect to the interface chosen by the LON USB or BACnet option. Item 45 may indicate a cancel button. Pressing this button may cancel any connection operation and close the window. Item 46 may indicate a Help Button. Pressing this button may bring up a help screen to describe the different operations and remedies for problems on the connect screen.

Figure 4:
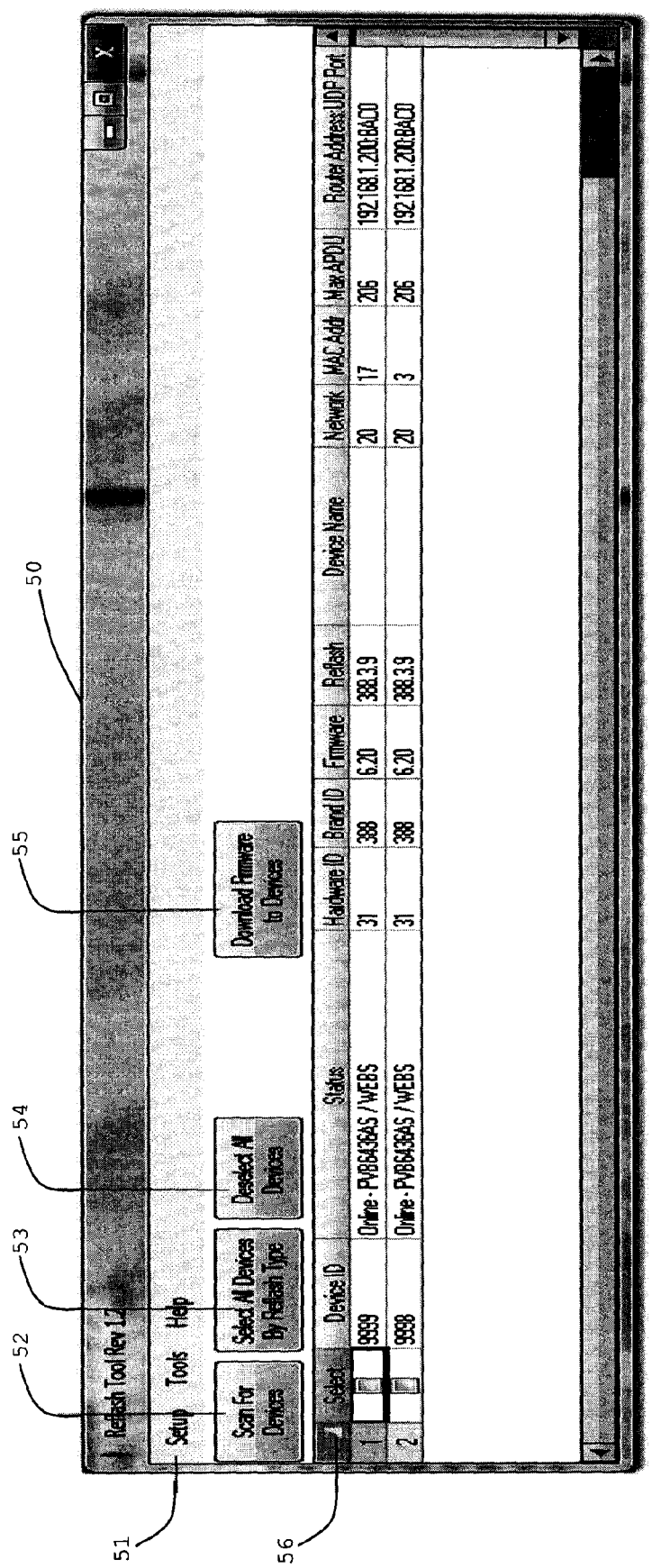
FIG. 4 may be a diagram of a main screen.

FIG. 4 may be a diagram of a main screen 50. The main screen may allow for the searching of devices, selection of those devices and selection of application and firmware files to be downloaded. The screen may contain a scrollable grid list with columns of information for each device. One may refer to the main screen diagram for specific information for each field and control contained in the screen.

Item 51 may indicate menu selections as indicated by the following. Setup may be where one can create a project name and to connect to a device network. Tools may have the following options. Download Firmware may be where one can download firmware to a group of devices. Change LON Node/Subnet/Domain may be where one can to change the Node, Subnet and Domain of a particular device. This selection may be only available when connected to a LON network. Help for view help may be a selected to open the help file. Help for information about the reflash tool may be selected to view the splash screen which contains the current version for the reflash tool program and definition file.

Item 52 may indicate scan for devices. One may press this button to scan the device network for devices. If any devices are discovered, they may be listed in a device information list at item 56. If no devices are found then one may consult the Help screen for remedies.

Item 53 may indicate select all devices by reflash type. One may press the button to select all of the devices of a particular reflash type in the device information list. One device may be selected by clicking on the check box in the "Select" column, and then the button may be pressed to select all of the other devices that match the same reflash type automatically. If one had selected more than one device with different reflash types, it may select the first type that it encounters in the list and deselect all other types.

Item 54 may indicate deselect all devices. Pressing the button may deselect all of the devices listed in the device information list. Item 55 may indicate download firmware to devices. Pressing the button may download firmware to a group of devices. Before pressing this button, one should make sure that at least one device in the device information list is selected.

Item 56 may indicate the device information list. The list may display all of the devices found when the "Scan for Devices" button is pressed. The following is a list of columns that may be displayed for each device. The Select column may be used to tag or select which device or devices will be downloaded. The Neuron/Device ID column may display the device's unique identification number. The Status column may display the current status of a device. After the "Scan for Device" button has been pressed, this column may display the online/offline status as well as its Model/Brand information. This column may be updated during the firmware download process. The Hardware ID column may display the device's physical hardware type. The Brand ID column may display the device's brand ID. The Firmware column may display the device's firmware version. The Reflash column may display the device's reflash version. The reflash version may determine what firmware can be downloaded to the device. All devices should have the same reflash version when downloading firmware to multiple devices. The Device Name column may display the device's name loaded in the device. The name may be cleared after downloading firmware to the device. The Subnet column may display the device's subnet address (LON only). The Node column may display the device's node address (LON only). The Domain0/1 column may display the device's domain ID (LON only). Two values may be displayed. Domain 0 and Domain 1 may be XX/XX where XX for each domain value may be as follows: none=domain is not used; zero=domain is zero length domain; and 00-FF=domain number in hexadecimal. The Program ID column may display the device's program ID (LON only). The Network column may display the BACnet network number on which the Spyder is discovered (BACnet only). The MAC Addr column may display the device's MAC Address value (BACnet only). The Max APDU column may display the device's Max ADPU value (BACnet only). The Router Address: UDP Port column may display the BACNET/IP router IP address and its corresponding UDP port (BACnet only). The UDP port may be selected from the connect screen.

Figure 5:
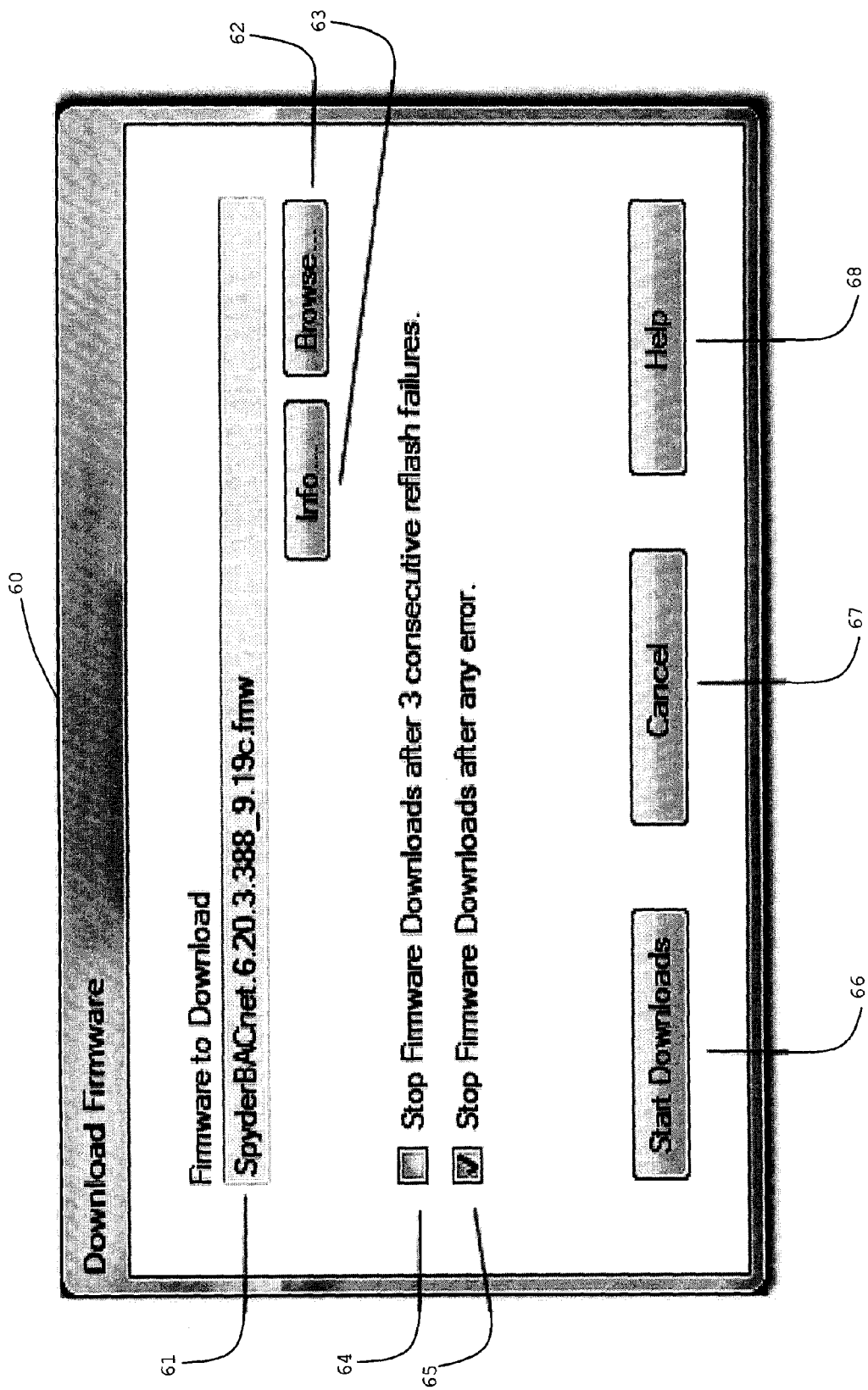
FIG. 5 is a diagram of a download application and firmware screen.

FIG. 5 is a diagram of a download application and firmware screen 60. Screen 60 may write firmware to a group of one or more devices.

One may be warned that downloading new firmware to a device will erase the device's current application, balancing and binding information. One should take corrective action to insure that the application for a device is available to be downloaded. One may download the application using other tools (i.e., AX, WEBS, and so forth) after the device has received new firmware.

When the device has received the new firmware it should reset and start executing the new firmware. This may be confirmed in the tool by observing that the firmware version of the device has updated. If the download is abruptly terminated and a Spyder reflash has not been successful one may do the following steps: 1) Rescan the network and the software should automatically attempt to reflash any devices that were left in an incomplete reflash state. 2) Visually verify that all devices in the scan have the correct updated firmware; and if not, then one may select the ones that do not have the correct firmware and try downloading new firmware again.

One may refer to the download application and firmware screen 60 for specific information for each field and control contained in the screen. Item 61 may indicate a firmware file name. This read only field may display the file name of the firmware to be written to the device or devices. The name may be selected by using a "Browse" button 62 on the bottom right corner of the field. The browse button 62 may be used to find the firmware file.

Item 62 may indicate a browse firmware button. The button may open a browse dialog to allow the user to search for a firmware file to download to the device or devices. Once a firmware file has been located, it may be internally verified for correctness and displayed in a "Firmware to Download" field.

Item 63 may indicate a firmware info button. The button may display additional comments and information stored in the firmware file. This information may be used to verify if the firmware is the correct file to download to the device or devices.

Item 64 may indicate a box for stop firmware downloads when encountering consecutive errors. One may check this box to stop downloading firmware to a group of devices after three devices in a row have had download failures. This may reduce the impact of downloading firmware to a large number of devices when there is an unexpected problem.

Item 65 may be a box for stop firmware downloads after any error. One may check this box to stop downloading firmware anytime it encounters an error that causes a device to fail a download. Typically the software may attempt to retry a single operation three times before flagging an error. This box may take precedence over the consecutive errors choice. If neither box is checked, then all selected Spyders may be done, regardless of errors.

Item 66 may indicate a Start Downloads Button. The button may be pressed to download the firmware files into the selected device or devices. After pressing the button, the screen may close and a status window may open to display the download status.

Item 67 may indicate a Cancel Button. This button may be pressed to close the screen. A Cancel will not necessarily start a download operation. Item 68 may indicate a Help Button. This button may be pressed to show the help file.

Figure 6:
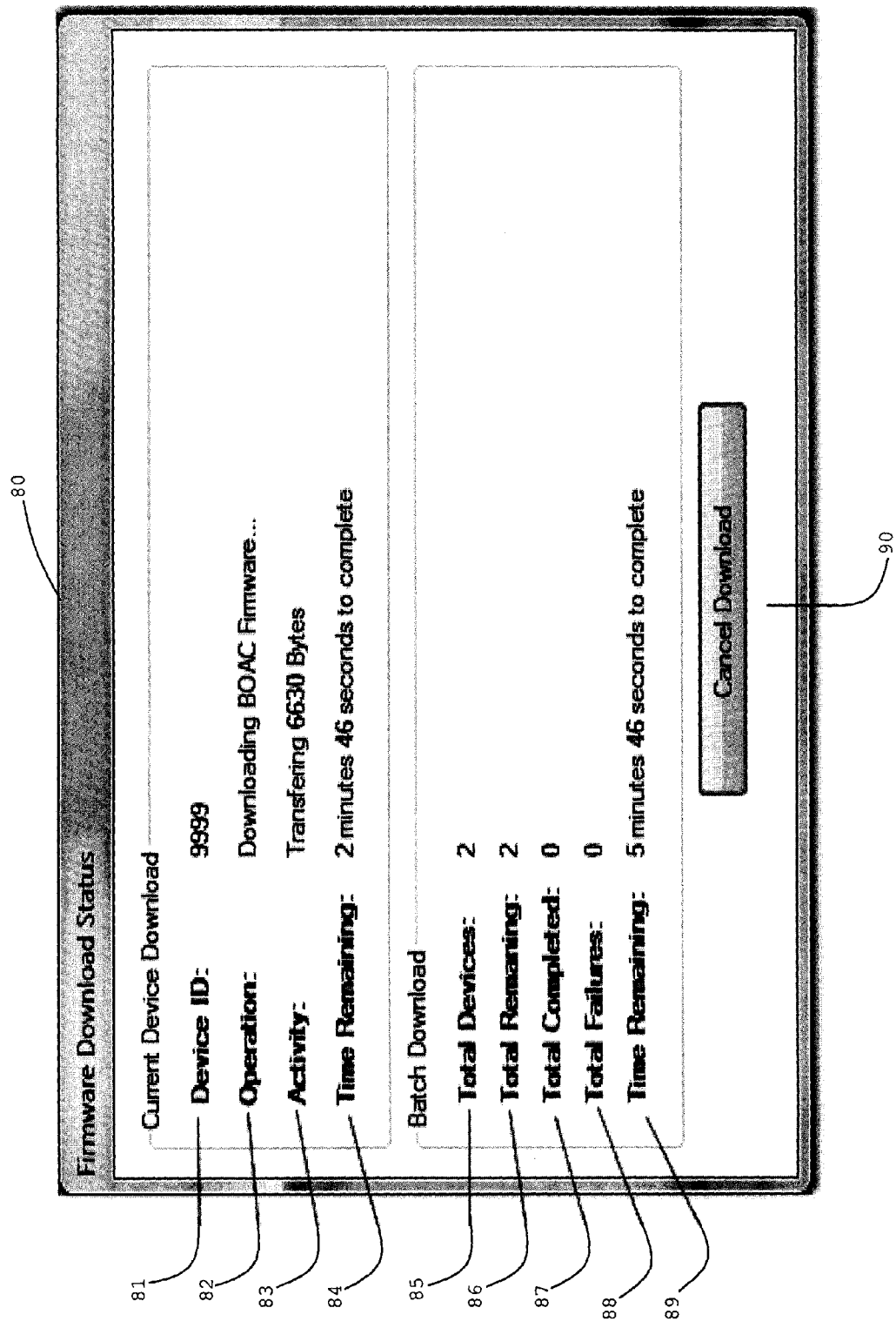
FIG. 6 is a diagram of a download status screen.

FIG. 6 is a diagram of a download status screen 80. The download status screen may be displayed while the software is downloading firmware to device or devices. The screen may display a status of the current device under download as well as a status of the entire batch of devices if more than one device was being downloaded. The cancel button may allow the user to stop the downloading process, but it cannot necessarily stop instantaneously since it needs to get to a safe situation before it can stop to prevent devices from being corrupted or receiving incomplete firmware.

The download status screen 80 may be referred to for specific information for each field and control contained in the screen. The following numbered list may represent possible status messages displayed during the download firmware operation. 1) Begin Firmware Download—The firmware download process may have begun. The device may be preparing to accept the new firmware after validation. 2) Incorrect Brand ID—The brand ID in the firmware being downloaded does not necessarily match the brand ID for the device. This may cause a download failure. 3) Incorrect Reflash Version—The reflash version in the firmware being downloaded does not necessarily match the reflash version for the device. This may cause a download failure. 4) Incorrect BOAC Reflash Version (BACnet Mode)—The BOAC reflash version in the firmware being downloaded does not necessarily match the BOAC reflash version for the device. This may cause a download failure. 5) Entering Firmware Program Mode (LON Mode)—The LON device may have verified that the firmware being downloaded is the correct version and is ready to accept the download transfer. 6) Can't Enter Firmware Program Mode (LON Mode)—The LON device may have verified that the firmware being downloaded is the correct version, but is unable to accept the download transfer. This may cause a download failure. 7) Downloading Firmware Host File 1 (LON Mode)—The LON device may be receiving the first part of the firmware reflash file. 8) Retrying Firmware Host File 1 (LON Mode)—An error may have occurred during the transfer of the first part of the firmware reflash file and it may be retrying to receive firmware file again. 9) Can't Download Firmware Host File 1 (LON Mode)—After three attempts, the first part of the firmware reflash file could not necessarily be received without errors. This may cause a download failure. 10) Downloading Firmware Host File 2 (LON Mode)—The LON device may be receiving the second part of the firmware reflash file. 11) Retrying Firmware Host File 2 (LON Mode)—An error may have occurred during the transfer of the second part of the firmware reflash file and it may be retrying to receive firmware file again. 12) Can't Download Firmware Host File 2 (LON Mode)—After three attempts, the second part of the firmware reflash file could not necessarily be received without errors. This may cause a download failure. 13) Exiting Firmware Program Mode (LON Mode)—The first and second parts of the firmware reflash file may have been received and the LON device is now verifying the files. If this operation completes successfully, the device may reboot with the new firmware. 14) Can't Exit Firmware Program Mode (LON Mode)—The first and second parts of the firmware reflash file may have been received, but the LON device may have been unable to verify the files or the device was not able to reboot successfully with the new firmware. This may cause a download failure. 15) Unloading BOAC Firmware (BACnet Mode)—The BACnet device may be unloading its current BOAC firmware so that it can accept the new BOAC firmware being downloaded. 16) Can't Unload BOAC Firmware File (BACnet Mode)—The BACnet device may have been unable to unload its current BOAC firmware. This may cause a download failure. 17) Downloading BOAC Firmware (BACnet Mode)—The BACnet device may be receiving the new BOAC firmware being downloaded. 18) Retrying BOAC Firmware File (BACnet Mode)—The BACnet device may have encountered an error receiving new BOAC firmware being downloaded and may be retrying the download BOAC firmware file transfer. 19) Can't Download BOAC Firmware File (BACnet Mode)—After three attempts, BACnet device may have been unable to receive new BOAC firmware being downloaded because of file transfer errors. This may cause a download failure. 20) Loading BOAC Firmware (BACnet Mode)—The BOAC device may be attempting to load the new BOAC firmware and reboot the BOAC processor. 21) Can't Load BOAC Firmware File (BACnet Mode)—The BACnet device may have been unable to load the new BOAC firmware and/or reboot the BOAC processor. This may cause a download failure. 22) Unloading HOST Firmware (BACnet Mode)—The BACnet device may be unloading its current HOST firmware so that it can accept the new HOST firmware being downloaded. 23) Can't Unload HOST Firmware File (BACnet Mode)—The BACnet device may have been unable to unload its current HOST firmware. This may cause a download failure. 24) Downloading HOST Firmware (BACnet Mode)—The BACnet device may be receiving the new HOST firmware being downloaded. 25) Retrying HOST Firmware File (BACnet Mode)—The BACnet device may have encountered an error receiving new HOST firmware being downloaded and may be retrying the download HOST firmware file transfer. 26) Can't Download HOST Firmware File (BACnet Mode)—After three attempts, BACnet device may have been unable to receive new HOST firmware being downloaded because of file transfer errors. This may cause a download failure. 27) Loading HOST Firmware (BACnet Mode)—The BACnet device may be attempting to load the new HOST firmware and reboot the HOST processor. 28) Can't Load HOST Firmware File (BACnet Mode)—The BACnet device may have been unable to load the new HOST firmware and/or reboot the HOST processor. This may cause a download failure. 29) Firmware Download Completed/Verified—The firmware may have been successfully downloaded and loaded into the device. The device may have been able to reboot properly with the new firmware. 30) Downloading Stopped (3) consecutive errors—The download process may have been terminated because three devices in a row have failed to complete the download firmware transfer successfully. 31) User Canceled Download—The download process may have been terminated because the user has pressed the cancel button on the status screen. 32) Download Completed—The download process may have been completed successfully and all the devices in the download may have been reflashed successfully. 33) Download Completed with failures—The download process may be completed, but some of the devices in the download may not have reflashed successfully and been flagged as failures.

Download status screen diagram 80 may have a number of items to consider. Item 81 may indicate a device identification. This field may display the device identification for the device that might be currently receiving a firmware download. This field may be "Neuron ID" for LON and "Device ID" for BACnet. Item 82 may indicate a download operation. This field may display the software operation being executed on the current device. Item 83 may indicate download activity. This field may display the communications activity is sent to the current device. Item 84 may indicate current device download time remaining. This field may display the estimated time remaining to complete the firmware download to the current device. Sometimes, the estimated time may be short and a message "A few more seconds remaining to complete" may be shown until the download operation completes. Item 85 may indicate batch total devices. This field may show the total number of devices to receive firmware downloads. Item 86 may indicate batch total devices remaining to download. This field may show the total number of devices remaining to receive firmware downloads. Item 87 may indicate batch total device downloaded successfully. This field may show the total number of devices that have received firmware downloads successfully and have verified that the firmware is up and running on the device. Item 88 may indicate batch total devices failed download. This field may show the total number of devices that have received firmware downloads but had errors or the firmware did not boot up successfully on the device. Item 89 may indicate batch download time remaining. This field may display the estimated time remaining to complete the firmware download on the remaining devices. Sometimes, the estimated time may be short and a message "A few more seconds remaining to complete" may be shown until the download operations completes. This field may take into account past performance to estimate the time remaining. Item 90 may indicate cancel download. The cancel button may allow the user to stop the downloading process, but it cannot necessarily stop instantaneously since it needs to get to a safe situation before it can stop to prevent devices from being corrupted or receiving incomplete firmware. This button may change to "Please wait . . . " after it has been pressed to allow the software to complete the downloading on the current device. After the current device has completed, the button may change to "Close" and the user may examine the final status before pressing the button to close this screen.

Virtually all download operations may be logged so that details of the download can be saved for later reference. The project name defined on the "Connect" Screen may be used to name the log files. The log files may be stored on the computer.

Three log files may be saved on the computer. 1) <ProjectName>.search.log.txt. This file may contain a description of the devices found during the search. If a device is not showing up when searching, this log file may be checked to see if the device is being detected. It might not be showing up in the search because it is not a Spyder type of device. This log file may also save a copy of the search information displayed on the main screen if any device or devices were found during the search. This information might be useful after reflashing devices, since it may have the original firmware version of the device before it was reflashed to another version.

2) <ProjectName>.summary.log.txt. This log file may save a copy of the information displayed on the main screen of any device that was reflashed. This information may be useful after reflashing devices, since it could have the new firmware version of the device after it was reflashed to another version.

3) <ProjectName>.transfer.log.txt. This log file may save details of the complete reflashing procedure for each device that was reflashed. This information may be useful after reflashing devices, since it could contain a complete log of all the operations that were executed on the device during the reflash process. This log may be most importantly useful when the device fails to be reflashed successfully since it may contain the exact error or errors that caused the failure and may help identify the particular problems causing the failure.

There may be an approach for a secure network based identification of field upgradeable units. Devices or units with embedded firmware, in which the firmware may be upgraded by the customer, may be described as field upgradeable. Field upgrading the firmware may be used to resolve some latent defect or to introduce/remove some capability into/from a device. However, performing a field upgrade of the firmware may not necessarily always be desirable.

Deciding when it should be possible/desirable to field upgrade a target device may sometimes be driven by technical limitations. For example, new firmware may require certain hardware capabilities which may or may not be in the target device. It seems that only after identifying the hardware capabilities of the target device may the decision to allow or restrict the firmware upgrade to be made. At other times, the decision of allowing field upgrading of devices may be driven by the business. For example, customers who paid more for their devices originally may be allowed to upgrade their firmware in the field, whereas customers who paid less for the devices may be restricted from upgrading their firmware in the field. The ability to identify whether the target device is "expensive" or "cheap" may be necessary for a proper outcome.

Since firmware upgrades may utilize a PC tool, a reliable cooperative process should exist to identify the target units to the tool/user so that a decision can be made on whether or not firmware upgrades should be allowed. The process should be secure.

The present system may pertain to a PC tool which should communicate with the devices through some way for both their identification and firmware upgrading. In this scheme, security may need to be considered at the target device, the PC, and the communication between target device and the PC.

To ensure secure identification of the target itself, the target device should have read-only contents to identify it. These contents may be entered into the device at the factory through a special approach. From there on, that information cannot necessarily be changed by any way except through the firmware upgrade process itself. Since, as this disclosure may be going to show, the process of allowing firmware upgrades may be secure, the ability to change this read-only information may also be inherently secure.

Once target device identification data is securely delivered to the PC tool, that tool may then need some way of using that data to determine if the firmware upgrades should be allowed. This may require some dictionary of rules for what is and is not allowed. To guarantee overall security, this dictionary itself may have to be secure. That may be achieved through any standard encryption approaches that are known to both the PC tool consuming the dictionary as well as whatever is used to create the encrypted dictionary in the first place.

There may need to be a way of creating an encrypted dictionary file. The PC tool may need to be able to internally decrypt the dictionary file. The PC tool may need to reference the decrypted contents of the dictionary file for making decisions about allowing firmware upgrades on discovered target devices. The target devices may need to have some network accessible identification contents. These contents may need to be read-only with the only exception being the act of upgrading the firmware. The target may need to be only reflashable via the communication network.

To recap, a field firmware upgrade mechanism may incorporate one or more building control system devices having firmware, connected to a communication network, a computer connected to the communication network, and a tool that reflashes to upgrade firmware, operated by the computer. The tool may discover the one or more devices on the network eligible for an upgrade of firmware. The tool may reflash the firmware with an upgrade for the one or more eligible devices which are placed in a queue for sequential reflashing the firmware of the one or more eligible devices automatically without prompting for each device by an operator. The upgrade of firmware may be secure from public disclosure.

The tool may check eligibility of a device before the tool begins a reflash of the firmware in the device with an upgrade even though the device might have been discovered earlier as eligible for the upgrade, to avoid an undesired reflash in case something caused the device to be ineligible during a period of time between having been discovered and a start of a reflash of the firmware in the device.

An approach for upgrading firmware in multiple units in a building automation system, may incorporate providing a tool program in a computer, and discovering virtually all devices having firmware on a communication network. The devices may be identified over the communication network to the tool program. The tool program may refer to a dictionary to determine if the devices identified are eligible for a firmware upgrade. If the devices are eligible for a firmware upgrade, then the firmware upgrade may be commenced with a reflash of firmware of a device and the firmware upgrade may proceed automatically through virtually all of the devices that are eligible for a firmware upgrade.

A question whether the devices are eligible for a firmware upgrade, may be provided by one or more rules in the dictionary that describe technical and/or business driven limitations of upgradability of firmware of a device.

The devices may be classified into one or more groups. The one or more groups may incorporate a first group having devices with firmware reflashable to a first version, a second group having devices with firmware reflashable to a second version, and so on in an order. The one or more groups may further incorporate an additional group having devices with firmware not necessarily reflashable.

The approach may further incorporate selecting virtually all devices in one of the one or more groups with firmware for upgrading, and selecting a version for a group having the devices with firmware reflashable to a selected version for upgrading.

The dictionary may indicate applicable versions for upgrading firmware based on identities of devices. The available versions may be pre-filtered to selected versions for upgrading firmware of devices.

The approach may further incorporate proceeding with a firmware upgrade of the devices eligible for a firmware upgrade with a reflash of one device at a time in a serial fashion. In a sequential manner of a firmware upgrade of a block of devices, the tool program may look at a status of previous reflashes. If one or more reflash operations have failed, the tool program may abort subsequent reflashes.

The approach may further incorporate proceeding with a firmware upgrade of the devices eligible for a firmware upgrade with a reflash of two or more devices at a time in a parallel fashion.

The approach may further incorporate adapting a characteristic of a progress bar which adjusts a period of time for a firmware upgrade according to known information about one or more reflashes of firmware of one or more devices eligible for a firmware upgrade.

The tool program may have displayable graphical elements driven from data processed by the tool program before a firmware upgrade. The displayable graphical elements may reveal characteristics of an imminent firmware upgrade.

The firmware upgrade may be proprietary and/or secured from public availability. The dictionary may be proprietary and/or secured from public availability.

A system for upgrading firmware in multiple devices, may incorporate a computer, a firmware upgrading tool situated in the computer, and one or more devices, having embedded firmware, accessible for communication with the computer. The firmware upgrading tool may find and queue up the one or more devices on the network for firmware upgrades.

The firmware upgrading tool sequentially in an automatic fashion may upgrade firmware of the one or more devices. The one or more devices may identify themselves to the firmware upgrading tool.

The system may further incorporate a dictionary where the firmware upgrading tool determines which of the one or more devices is capable of a firmware upgrade, according to an identity of a device. Virtually all of the one or more devices may be classified by the firmware upgrading tool into one or more groups. The one or more groups may incorporate a group 1 reflashable to a first version, a group 2 reflashable to a second version, and so on, through a group N reflashable to an Mth version. Reflashable may mean that a device is capable of a firmware upgrade. N may be a total number of groups reflashable to a version. M may be a total number of versions of a firmware upgrade.

The firmware upgrading tool may automate a selection of virtually all of the one or more devices in a same group to simplify and/or expedite firmware upgrading of the one or more devices.

The firmware upgrading tool may upgrade the firmware of the one or more devices one at a time. The firmware upgrading tool may look at a status of previous firmware upgrades 1, 2, . . . R, to check if one or more of the upgrades have failed. If one or more of the upgrades have failed, then the firmware upgrading tool will abort subsequent upgrades. R may be a number of upgrades.

The firmware upgrading tool may incorporate a progress bar. The progress bar may indicate an amount of time that an upgrade needs based on available information about the upgrades. The progress bar may incorporate displayable graphical elements that indicate amounts of time of the upgrades driven by available information about the upgrades.

The firmware upgrade may be proprietary and/or secured from public availability. The dictionary may be proprietary and/or secured from public availability.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A field firmware upgrade mechanism comprising:
    one or more building control system devices including at least one heating, ventilation, and air condition device having firmware, connected to a communication network;
    a computer connected to the communication network; and
    a tool that reflashes to upgrade firmware, operated by the computer; and
    wherein:
    the tool discovers the one or more devices on the network eligible for an upgrade of firmware;
    the devices are classified into one or more groups;

the one or more groups comprise a first group having devices with firmware reflashable to a first version, a second group having devices with firmware reflashable to a second version;

the one or more groups further comprise an additional group having devices with firmware not reflashable;

the tool reflashes the firmware with an upgrade for the one or more eligible devices which are placed in a queue for sequential reflashing the firmware of the one or more eligible devices automatically without prompting for each device by an operator; and the upgrade of firmware is secure from public disclosure; and the tool rechecks eligibility of the one or more devices before the tool begins the reflash of the firmware in the device with an upgrade even though the one or more devices might have been discovered earlier as eligible for the upgrade, to avoid an undesired reflash in case something caused the device to be ineligible during a period of time between having been discovered and a start of the reflash of the firmware in the one or more devices such that the eligibility of the one or more devices for an upgrade is checked at least twice before the tool begins the reflash of the firmware.

2. A method for upgrading firmware in multiple units in a building automation system, comprising:

providing a tool program in a computer; and discovering all devices capable of being discovered and having firmware on a communication network including at least one heating, ventilation, and air condition device; and wherein:

the devices are identified over the communication network to the tool program;

the devices are classified into one or more groups;

the one or more groups comprise a first group having devices with firmware reflashable to a first version, a second group having devices with firmware reflashable to a second version; and the one or more groups further comprise an additional group having devices with firmware not reflashable the tool program refers to a dictionary to determine if the devices identified are eligible for a firmware upgrade;

if the devices are eligible for a firmware upgrade, then the firmware upgrade is commenced with a reflash of firmware of a device and the firmware upgrade proceeds automatically through the devices that are eligible for a firmware upgrade;

proceeding with a firmware upgrade of the devices eligible for a firmware upgrade with a reflash of one device at a time in a serial fashion;

in a sequential manner of a firmware upgrade of a block of devices, the tool program looks at a status of previous reflashes; and if one or more reflash operations have failed, the tool program can abort subsequent reflashes;

wherein the tool program checks eligibility of the devices before proceeding with the firmware upgrade in the device even though the devices might have been discovered earlier as eligible for the upgrade, to avoid an undesired reflash in case something caused the devices to be ineligible during a period of time between having been discovered and a start of a firmware upgrade in the devices such that the eligibility of the devices for an upgrade is checked at least twice before the tool begins the reflash.

3. The method of claim 2, wherein a question whether the devices are eligible for a firmware upgrade, is provided by one or more rules in the dictionary that describe technical and/or business driven limitations of upgradability of firmware of a device.

4. The method of claim 2, further comprising:

selecting all devices capable of being selected in one of the one or more groups with firmware for upgrading; and selecting a version for a group having the devices with firmware reflashable to a selected version for upgrading.

5. The method of claim 4, wherein:

the dictionary indicates applicable versions for upgrading firmware based on identities of devices; and available versions are pre-filtered to selected versions for upgrading firmware of devices.

6. The method of claim 2, further comprising proceeding with a firmware upgrade of the devices eligible for a firmware upgrade with a reflash of two or more devices at a time in a parallel fashion.

7. The method of claim 2, further comprising adapting a characteristic of a progress bar which adjusts a period of time for a firmware upgrade according to known information about one or more reflashes of firmware of one or more devices eligible for a firmware upgrade.

8. The method of claim 2, wherein:

the tool program has displayable graphical elements driven from data processed by the tool program before a firmware upgrade; and the displayable graphical elements reveal characteristics of an imminent firmware upgrade.

9. The method of claim 2, wherein:

the firmware upgrade is proprietary and/or secured from public availability; and the dictionary is proprietary and/or secured from public availability.

10. A system for upgrading firmware in multiple devices, comprising:

a computer;

a firmware upgrading tool situated in the computer; and one or more devices, having embedded firmware, accessible for communication with the computer including at least one heating, ventilation, and air condition device; and the firmware upgrading tool comprises a progress bar; and wherein:

the firmware upgrading tool finds and queues up the one or more devices on a network for firmware upgrades and the firmware upgrading tool rechecks eligibility of the one or more devices before the firmware upgrading tool upgrades firmware in the one or more devices even though the one or more devices might have been discovered earlier as eligible for the upgrade, to avoid an undesired upgrade in case something caused the one or more devices to be ineligible during a period of time between having been discovered and a start of the firmware upgrade in the one or more devices such that the eligibility of the one or more devices for an upgrade is checked at least twice before the tool begins the firmware upgrade;

the progress bar indicates an amount of time that an upgrade needs based on available information about the upgrades; and the progress bar comprises displayable graphical elements that indicate amounts of time of the upgrades driven by available information about the upgrades.

11. The system of claim 10, wherein the firmware upgrading tool sequentially in an automatic fashion upgrades firmware of the one or more devices.

12. The system of claim 11, wherein the one or more devices identify themselves to the firmware upgrading tool.

13. The system of claim 12, further comprising a dictionary where the firmware upgrading tool determines which of the one or more devices is capable of a firmware upgrade, according to an identity of a device.

14. The system of claim 13, wherein:
all of the one or more devices are classified by the firmware upgrading tool into one or more groups;
the one or more groups comprise a group 1 reflashable to a first version, a group 2 reflashable to a second version, through a group N reflashable to an Mth version;
reflashable means that a device is capable of a firmware upgrade;
N is a total number of groups reflashable to a version; and
M is a total number of versions of a firmware upgrade.

15. The system of claim 14, wherein the firmware upgrading tool automates a selection of the one or more devices in a same group to simplify and/or expedite firmware upgrading of the one or more devices.

16. The system of claim 10, wherein:
the firmware upgrading tool upgrades the firmware of the one or more devices one at a time;
the firmware upgrading tool looks at a status of previous firmware upgrades 1, 2, ... R, to check if one or more of the upgrades have failed;
if one or more of the upgrades have failed, then the firmware upgrading tool will abort subsequent upgrades; and
R is a number of upgrades.

17. The system of claim 13, wherein:
the firmware upgrade is proprietary and/or secured from public availability; and
the dictionary is proprietary and/or secured from public availability.

* * * * *